July 23, 1957 W. RAIMONDI 2,799,857
MACHINES FOR HANDLING APPLES AND THE LIKE
Filed Oct. 28, 1955 4 Sheets-Sheet 2

Inventor:
William Raimondi
By Wallace and Cannon
Attorneys

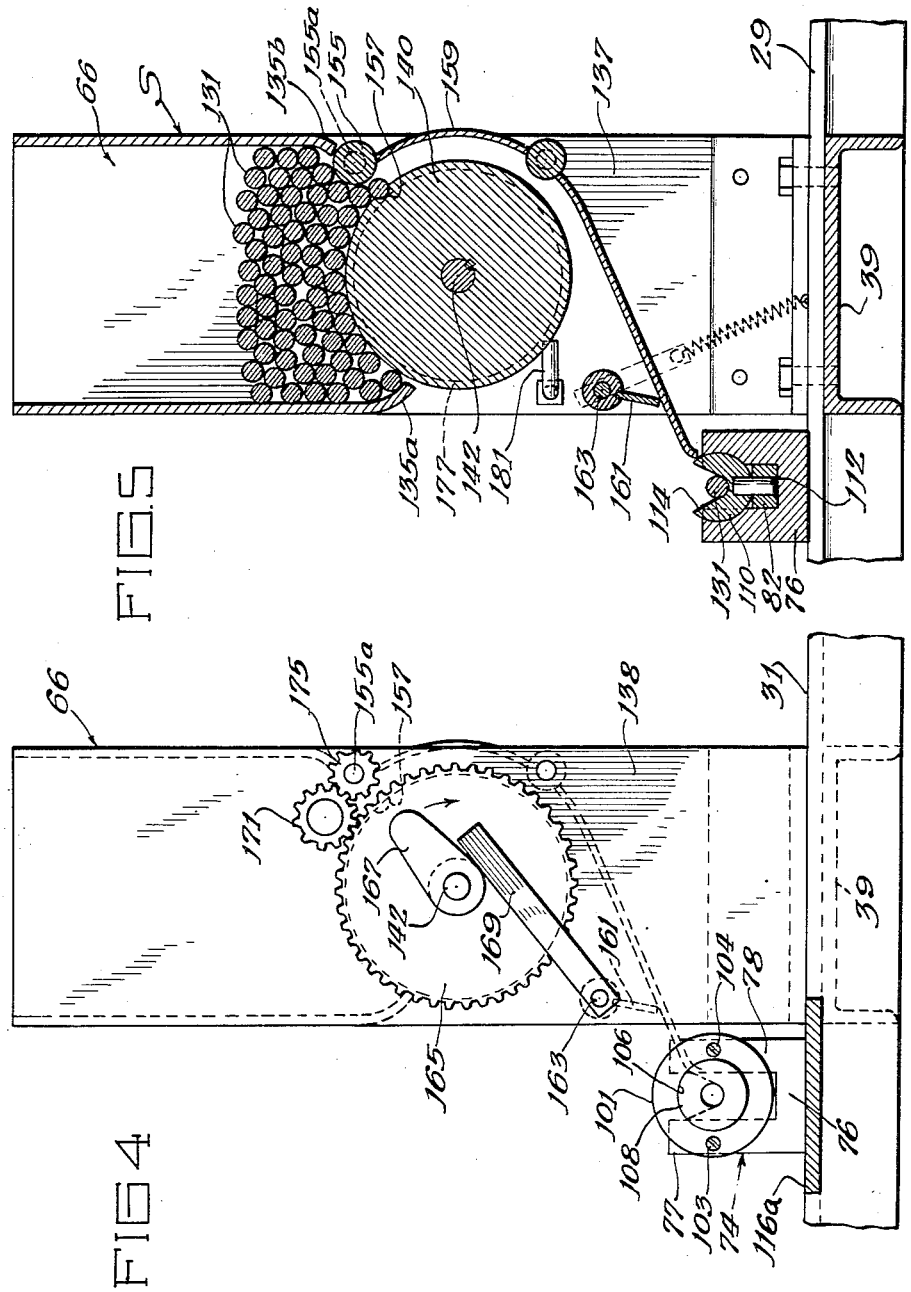

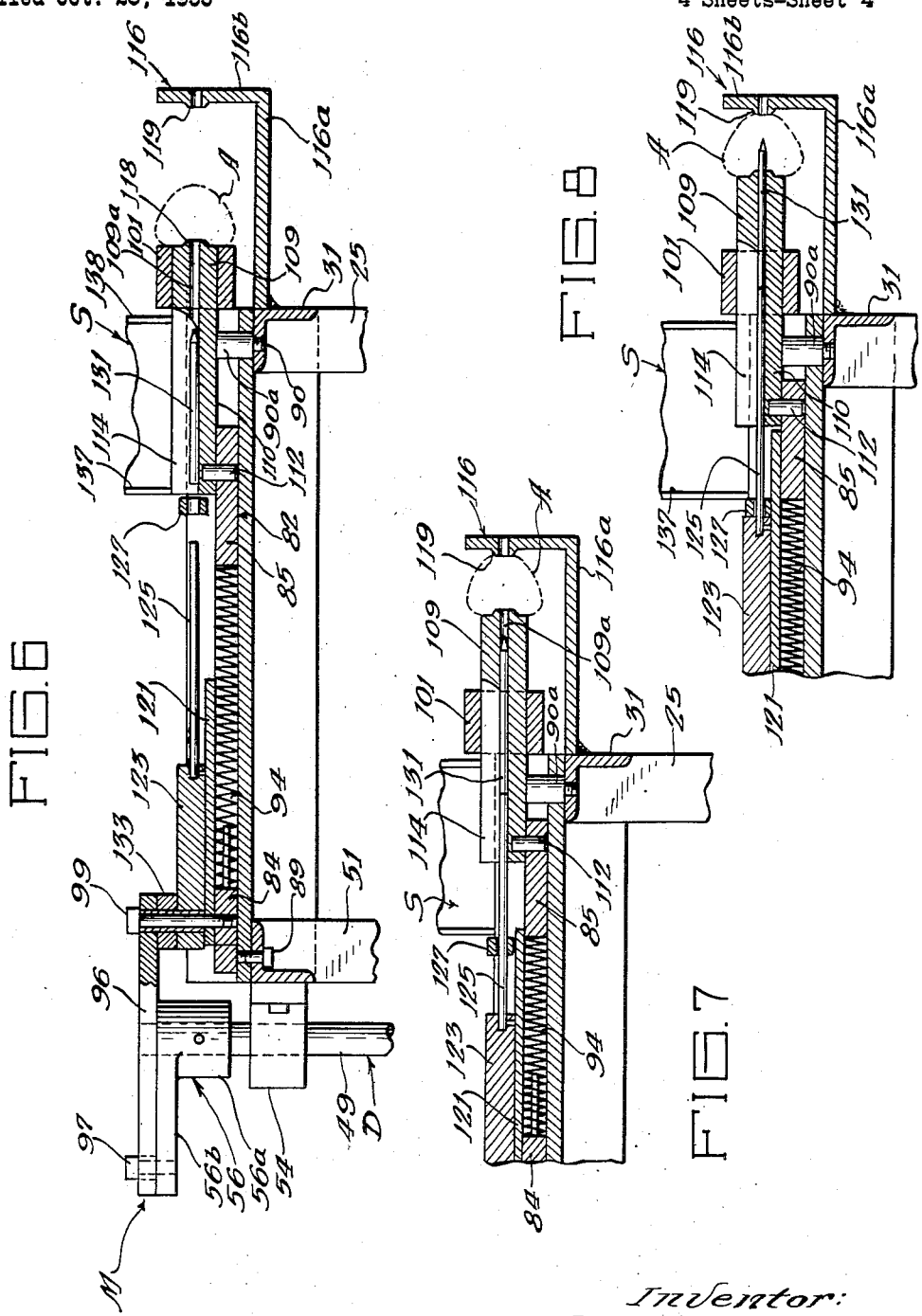

2,799,857

Patented July 23, 1957

2,799,857

MACHINES FOR HANDLING APPLES AND THE LIKE

William Raimondi, Cicero, Ill.

Application October 28, 1955, Serial No. 543,345

14 Claims. (Cl. 1—1)

This invention relates to machines for handling apples and the like, and more specifically, to machines which are particularly well adapted for mechanically inserting handle sticks into confection-coated apples and the like.

Devices for mechanically inserting handle sticks into confection-coated apples and the like, have heretofore been known in the art but such devices as have been heretofore known have had several inherent disadvantages such as, for example, being dangerous to use in that, in the use thereof, there was considerable danger of plunging the sharpened handle stick into the hand of the operator.

It is a principal object of my invention to effectively protect an operator from the danger of a handle stick being plunged into his hand during insertion of the stick into a confection-coated apple, or the like.

Another object of my invention is to afford a machine for inserting handle sticks into confection-coated apples, or the like, which is effective to clamp an apple in a novel and expeditious manner in position to receive a handle stick therein.

Another object is to afford a machine of the aforementioned type wherein an apple, or the like, is yieldingly clamped, in a novel and expeditious manner, during the stick-inserting operation in such a manner as to insure that the apple will not be excessively squeezed.

Yet another object of my invention is to afford a machine of the aforementioned type wherein handle sticks are automatically fed, in a novel and expeditious manner, into position to be inserted in such apples, or the like.

Another problem present in mechanical devices heretofore known in the art for inserting handles into apples and the like has been that such sticks were often fed entirely through the apples. It is an object of my invention to insure that handle sticks being fed into confection-coated apples, and the like, are not fed entirely therethrough.

A further object of my invention is to afford a machine of the aforementioned type wherein apples may be quickly, easily, and safely, fed by the operator into position to receive handle sticks therein.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 4 is a detail side elevational view of a portion of the mechanism shown in Fig. 1;

Fig. 5 is a detail sectional view taken substantially along the line 5—5 in Fig. 1;

Fig. 6 is a detail sectional view of a portion of the mechanism shown in Fig. 1, but showing parts thereof in a different position;

Fig. 7 is a view similar to Fig. 6 but showing parts thereof in different position; and Fig. 8 is a view similar to Figs. 6 and 7 but showing parts thereof in a still different position.

Figure 1:
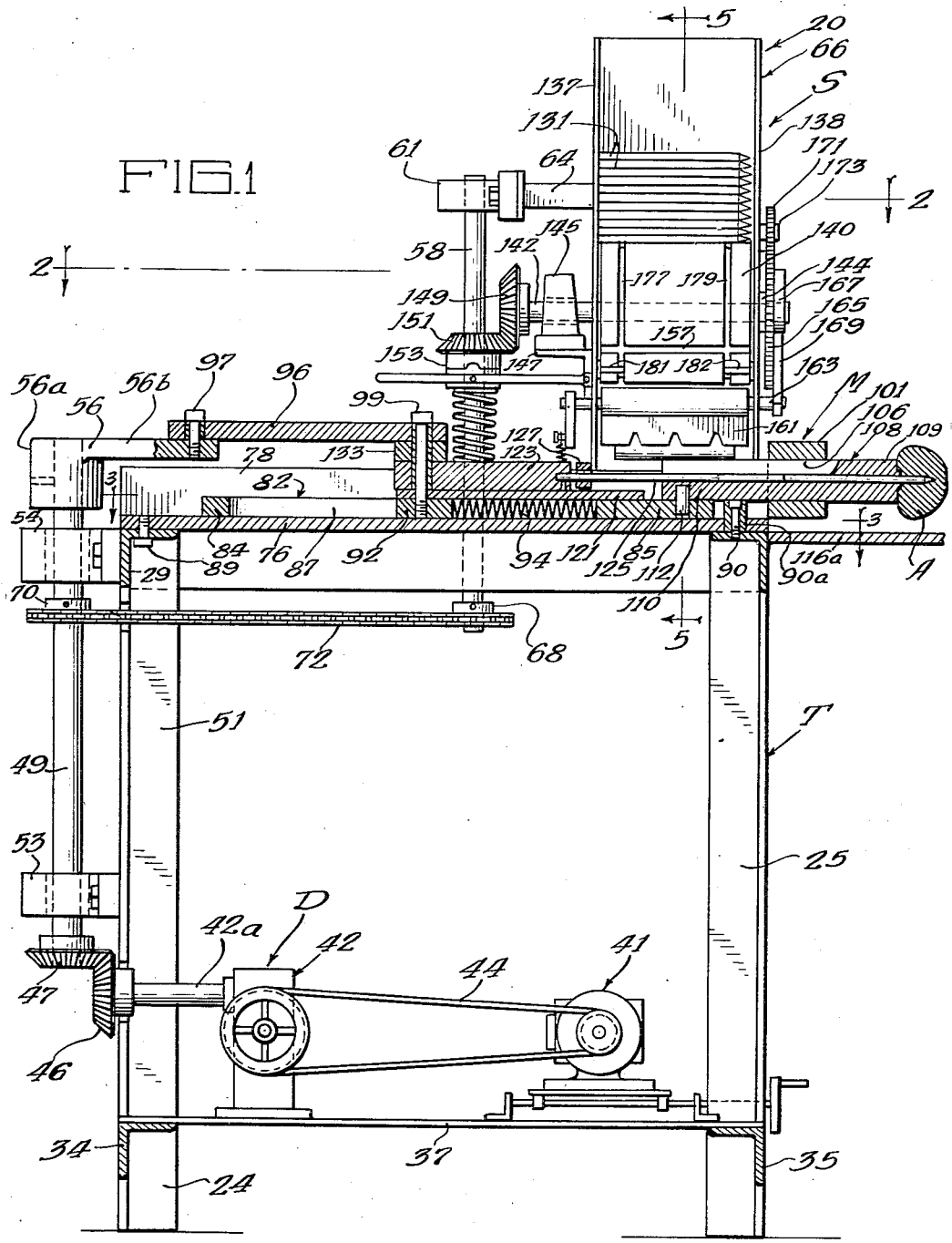
Fig. 1 is a front view, partly in section and partly in elevation, of a machine embodying the principles of my invention.

To illustrate the preferred embodiment of my invention, a machine 20 is shown in the drawings which embodies the principles of my invention.

In general, the machine 20, Fig. 1, embodies a combination apple-holding and stick-inserting mechanism M; a stick-feeding mechanism S for automatically feeding sticks one at a time to the inserting mechanism M; a drive mechanism D for driving the inserting mechanism M and the stick-feeding mechanism S in timed relation to each other; and a table T for supporting the inserting mechanism M, the feeding mechanism S, and the drive mechanism D.

Figure 2:
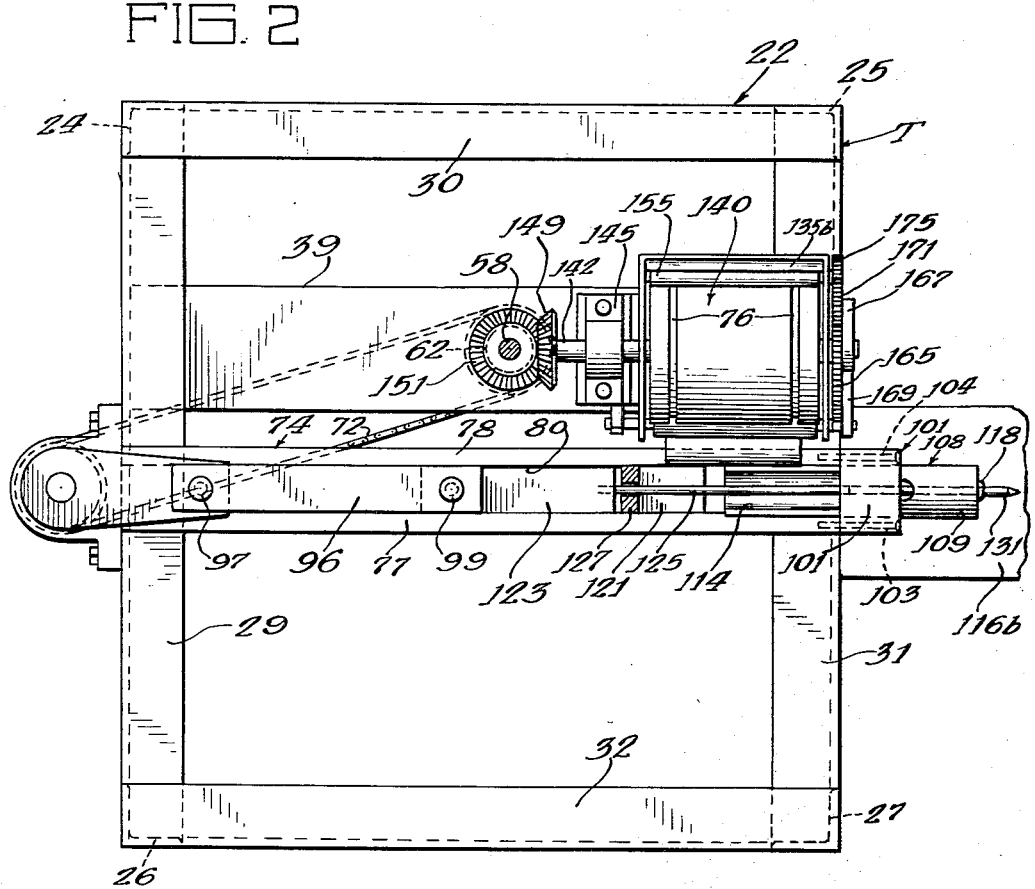
Fig. 2 is a sectional view taken substantially along the line 2—2 in Fig. 1.

The table T embodies a substantially square frame 22 mounted in horizontally extending position on four upright corner legs 24, 25, 26 and 27, Figs. 1 and 2. The frame 22 embodies four side rails 29, 30, 31 and 32 made of any suitable material such as, for example, angle irons and connected together at their ends in a manner wherein the side rails 29 and 31 are disposed in substantially parallel relation to each other, as are the side rails 30 and 32, Fig. 2. Two braces 34 and 35 extend between the lower end portions of the legs 24 and 26, and 25 and 27, respectively, in substantially parallel relation to each other. A cross brace 37 is mounted on and extends between the braces 34 and 35, Fig. 1, and affords structure for supporting a portion of the drive mechanism D as will be discussed in greater detail presently. Another cross brace 39 is mounted on and extends between the side rails 29 and 31, Fig. 2, and affords a base for supporting the stick feeding mechanism S.

The drive mechanism D embodies a suitable power unit such as a motor 41 mounted on the cross brace 37, Fig. 1. A speed reducer unit 42 is connected by a belt 44 to the motor 41 and is driven by the motor 41 during the operation of the latter. A drive shaft 42a extends from the speed reducer unit 42 and has a bevel gear 46 mounted thereon which is meshed with a bevel gear 47 mounted on the lower end portion of a substantially vertically disposed shaft 49. An elongated brace 51 is mounted in vertically extending position between the side rail 29 and the cross brace 34, Fig. 1, and the shaft 49 is journalled in bearings 53 and 54 mounted on the brace 51 and the side rail 29, respectively. The upper end portion of the shaft 49 projects above the upper bearing 54, and a crank 56 is mounted thereon for a purpose which will be discussed in greater detail presently.

Another drive shaft 58 is disposed in substantially parallel relation to the shaft 49, Fig. 1. The shaft 58 extends through the cross brace 39 and is journalled in bearings 61 and 62, Figs. 1 and 2, the bearing 61 engaging the upper end portion of the shaft 58 and being mounted on a bracket 64 which projects outwardly from the hopper 66 of the stick feeding mechanism S, Fig. 1, and the bearing 62 being engaged with the central portion of the shaft 58 and being mounted on the upper face of the cross brace 39, Fig. 2. The shaft 58 extends through the cross brace 39 and has a sprocket wheel 68 mounted on the lower end portion thereof. A sprocket wheel 70 is mounted on the shaft 49, below the bearing 54, and the sprocket wheels 68 and 70 are connected by a chain 72. Hence, it will be seen that upon operation of the motor 41, the shafts 49 and 58 are rotated thereby. Rotation of the shafts 49 and 58 is effective to actuate the inserting mechanism M and the stick feeding mechanism S, respectively, as will be discussed in greater detail presently.

The combination apple-holding and stick-inserting mechanism M includes an elongated, substantially rectangular shaped track 74, Figs. 1 and 2. The track 74 embodies a unitary member having a substantially rectangular shaped bottom wall 76 and two side walls 77 and 78 projecting vertically upwardly from the upper face of the bottom wall 76 and extending along respective longitudinal edge portions thereof in substantially parallel spaced relation to each other to thereby afford a trackway 80 on the upper face of the bottom wall 76 between the side walls 77 and 78, Figs. 1 and 2.

Figure 3:
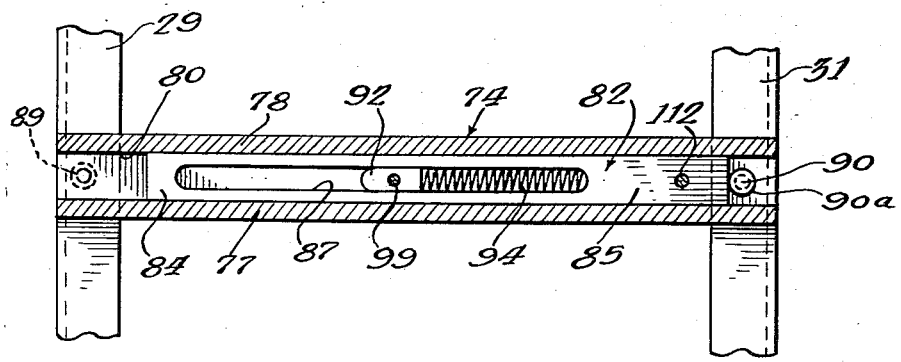
Fig. 3 is a detail sectional view taken substantially along the line 3—3 in Fig. 1.

An elongated slide 82, Figs. 1 and 3, is mounted in the trackway 80 in substantially snugly fitting but freely slidable relation thereto. The slide 82 has two oppositely disposed end portions 84 and 85, and a longitudinally extending elongated slot 87 is formed in the slide 82 between the end portions 84 and 85.

The track 74 is mounted on the side rails 29 and 31 of the table T and is secured thereto by bolts 89 and 90, respectively, Figs. 1 and 2. The track 74 is disposed substantially perpendicular to the length of the side rails 29 and 31 in position wherein the longitudinal center line thereof is disposed perpendicular to the longitudinal axis of the shaft 49. The slide 82 is mounted in the trackway 80 in position wherein the end portion 84 thereof is disposed the closest to the shaft 49, and the end portion 85 is disposed on the opposite side of the end portion 84 from the shaft 49.

A slide block 92 is slidably mounted in the slot 87 in the slide 82 for reciprocation longitudinally thereof. A compression coil spring 94 is disposed in the slot 87 of the slide 82 between the block 92 and the end portion 85 in position to yieldingly urge the block 92 toward the end portion 84 of the slide 82, Figs. 1 and 3.

The crank 56, which it will be remembered is mounted on the upper end portion of the shaft 49, has a hub portion 56a mounted on the upper end of the shaft 49 and an elongated arm 56b projecting radially outwardly from the hub portion 56a. The crank 56 is so disposed on the shaft 49 that the arm 56b is disposed in a horizontal plane above the plane of the upper face of the track 74. One end portion of a link 96 is connected by a bolt 97 to the free end portion of the arm 56b of the crank 56, and the other end portion of the link 96 is connected by a bolt 99 to the block 92.

The arm 56b of the crank 56 and the link 96 are preferably of such length, and so disposed relative to each other, that when the crank 56 is disposed in position wherein the arm 56b projects outwardly away from the track 74 in substantially longitudinal alignment therewith, the block 92 is disposed in engagement with the inner edge of the end portion 84 of the slide 82, and the outer edge of the end portion 84 is disposed closely adjacent to the outer longitudinal edge of the side rail 29 of the table T, Fig. 6. During rotation of the shaft 49, the crank turns from this position to the position shown in Fig. 1 wherein the arm 56b projects inwardly over the track 74 in substantially parallel relation thereto. During this movement of the crank 56, the arm 56b and the link 96 is effective to move the block 92 to the right as viewed in Fig. 1 and, therefore, by its yielding connection to the slide 82, by the spring 94, is effective to move the slide 82 toward the right as viewed in Fig. 1. A stop member 90a is mounted on the screw 90 in the center of the trackway 80 to thereby afford a positive stop limiting the extreme movement of the slide 82 to the right as viewed in Fig. 1. It will be noted that when the slide 82 is engaged by the stop 90a, or if it is otherwise stopped before reaching the stop 90a as shown in the drawings, the spring connection afforded between the block 92 and the slide 82 permits the block 82 to complete its full reciprocatory stroke toward the stop member 90a without exerting excessive force on the slide 92.

A substantially annular shaped guide collar 101 is mounted on the end of the track 74 disposed on the side rail 31 of the table T by suitable means such as screws 103 and 104 extending into the side walls 77 and 78, respectively, Figs. 1 and 2. The guide member 101 has a substantially cylindrical shaped opening 106 extending therethrough and is so disposed on the track 74 that the longitudinal center line of the opening 106 is disposed in the same horizontal plane as the longitudinal center line of the trackway 80, above the slide 82. A movable clamping jaw 108 having a substantially cylindrical shaped head or outer end portion 109 is slidably mounted in the opening 106 in the guide member 101 for reciprocation therethrough. An opening 109a extends axially through the head 109. The inner end portion 110 of the movable clamping jaw 108 is secured to the end portion 85 of the slide 82 by a pin 112, Fig. 1, and has an elongated substantially V-shaped notch formed in the upper portion thereof to afford an elongated cradle or trough 114, Figs. 1, 2 and 5, for supporting a stick 131, Fig. 6, therein longitudinally of the trackway 80. The trough 114 is so positioned in the jaw 108 to support a stick such as the stick 131, Fig. 6, in axial alignment with the opening 109a in the head 109. Reciprocation of the slide 82 is effective to reciprocate the jaw 108 inwardly and outwardly through the opening 106 in the guide member 101, and only approximately one-quarter of the outer periphery of the end portion 110 of the jaw 108 is cut away to afford the trough 114 so that in all positions of the jaw 108, it is firmly supported in the guide member 101.

A stationary substantially L-shaped jaw 116 having an elongated leg 116a and a shorter leg 116b is attached to the outer face of the side rail 31 of the table T by suitable means such as, for example, welding, in position wherein the leg 116b thereof is disposed in substantially parallel relation to the outer vertical face of the guide member 101 in horizontal alignment with the opening 106. The leg 116b of the jaw 116 is spaced from the guide member 101 such a distance that when the slide 82 is disposed in engagement with the stop member 90a, the outer end of the head 109 of the movable clamping jaw 108 is so disposed relative to the leg 116b of the stationary clamping jaw 116 that the jaw 108 and the leg 116b are effective to clampingly support therebetween an apple of the smallest size to be handled in my novel machine 20.

A boss 118 is mounted on the outer vertical face of the head 109 of the movable jaw 108 around the opening 109a therein. A similar boss 119 is mounted on the inner face of the leg 116b of the stationary jaw 116 in alignment with the opening 109a in the jaw 108. The bosses 118 and 119 are of a size and configuration adapted to fit into the dimples normally found in apples adjacent to the ends of the cores thereof, and afford means whereby the operator of my novel machine may readily center an apple between the jaws 108 and 116 as will be discussed in greater detail presently.

An elongated cover member 121 is mounted on the slide 82 with one end portion thereof disposed on the block 92, in position wherein the bolt 99 extends therethrough, Fig. 1. The cover member 121 fits relatively snugly in, but in freely slidable relation to, the trackway 80 in the track 74, and projects from the block 92 along the slide 82 toward the inner end of the movable jaw 108. The cover member 121 is preferably of such a length that when the block 92 is disposed in engagement with the end portion 84 of the slide 82, the cover member 121 extends across substantially two-thirds of the length of the slot 87 in the slide 82, Fig. 6 but, in any event, is of such a length that when the movable clamping jaw 108 is stopped from further movement to the right as viewed in Fig. 1, by engagement of the jaw 108 with the largest apple to be handled in my machine disposed in abutting relation to the leg 116b of the stationary clamping jaw 116, the free end portion of the cover member 121 is disposed in spaced relation to the inner end portion of the clamping jaw 108 when the block 92 is disposed in its innermost position, as shown in Fig. 1. The cover member 121 affords a retaining member which is effective to hold the spring 94 in the slot 87 during all movements of the block 92 in the slide 82.

A substantially rectangular-shaped ram 123 is mounted on the cover member 121, the bolt 99 extending through one end portion of the ram 123, and the other end portion of the ram 123 extending toward the guide member 101. The ram 123 is slidably mounted in the trackway 80 for longitudinal reciprocation therealong, and an elongated pusher pin 125 is mounted in the end portion of the arm 123 which projects toward the guide member 101. The pusher pin 125 is disposed in axial alignment with the axis of the opening 106 in the guide member 101, Fig. 1.

A guide collar 127 is mounted between the side walls 77 and 78 of the track 74 and is secured thereto by any suitable means such as, for example, welding. The guide collar 127 is disposed above the path of travel of the cover member 121, Fig. 1, between the ram 123 and the guide member 101. It is so positioned longitudinally of the track 74 that when the ram 123 is disposed in fully extended position, such as shown in Fig. 1, the free end of the ram 123 is disposed in closely adjacent, but spaced relation to the guide collar 127. The pusher pin 125 is of such length that when the ram 123 is disposed in fully retracted position, as shown in Fig. 6, the free end of the pusher pin 125 is disposed closely adjacent to, but in spaced relation to, the guide collar 127, and, when the ram 123 is disposed in fully extended position, such as shown in Fig. 1, the pusher pin extends through the guide collar 127, and the free end of the pusher pin 125 extends into the guide member 101 such a distance that a handle stick such as the stick 131, Fig. 1, positioned forwardly thereof in the head 109 of the slide 110 is pushed thereby into position wherein the free end thereof is disposed in position closely adjacent to, but spaced from, the leg 116b of the stationary jaw 116. Hence, it will be seen that during advancing movement of the ram 123 from fully retracted position such as shown in Fig. 6 to fully extended position such as shown in Fig. 1, with a stick such as the stick 131 disposed in a trough 114 at the initiation of such forward movement of the ram 123, the pin 125 is effective to push the stick 131 to the right, as viewed in Fig. 1, along the trough and through the head 109 of the slide 110 into the aforementioned position wherein the leading end of the stick 131 is disposed closely adjacent to the leg 116b of the stationary jaw 116.

A spacing block 133 is disposed between the ram 123 and the link 96, and the bolt 99 extends through the link 96, the spacing block 133, the ram 123, the cover member 121, and into the block 92, to thereby loosely clamp these members together. Hence, it will be seen that the ram 123 and the pin 125 are positively moved by the crank 56 and the link 96, and the slide 82 is indirectly, or, in other words, yieldingly, moved by the crank 56 and the link 96 by the actuation thereby of the slide block 92 and the spring 94 so that advancing movement of the movable jaw 110 may be stopped in any position and still permit the sliding block 92 to be moved through its entire forward stroke without applying excessive force to the slide 92 or the movable jaw 90.

The stick feeding mechanism S is driven by the drive mechanism D in timed relation to the actuation of the inserting mechanism M so that during each reciprocation of the ram 123 by the crank 56, a stick such as the stick 131 is fed from the hopper 66, Fig. 1, into position in the trough 114 from which it is advanced by the pusher pin 125 through the head 109 of the movable jaw 108.

The hopper 66 of the stick feeding mechanism S is supported by legs 137 and 138 mounted on the cross brace 39 on the table T in upright position, Figs. 1, 4 and 5. A substantially cylindrical shaped drum 140 is rotatably mounted between the legs 137 and 138, Figs. 1, 2 and 5, by a shaft 142 extending substantially horizontally therethrough and journalled in a bearing 144 mounted on the leg 138, and a bearing 145 mounted on a bracket 147 attached to the outer face of the leg 137.

A bevel gear 149 is mounted on the end portion of the shaft 142 which projects outwardly through the bearing 145 from the leg 137, and is meshed with a bevel gear 151 mounted on the shaft 58, Fig. 4. The bevel gear 151 is connected to the shaft 158 for rotation therewith by a clutch 153. Hence it will be seen that upon rotation of the shaft 58 by the motor 41, and with the clutch 153 engaged, the bevel gear 151 is operable to rotate the bevel gear 149 and thereby rotate the shaft 142 and the cylinder 140.

The sticks 131 when in stored position in the hopper 66 are disposed therein in substantially horizontally extending parallel relation to the longitudinal axis of the cylinder 140. One lower end portion 135a of one side of the hopper 66 is disposed in closely overlying relation to the peripheral surface of the cylinder 140, and the end portion 135b of the opposite side of the hopper 66 is disposed a greater distance from the peripheral surface of the cylinder 140, Fig. 5. A roller 155 having a shaft 155a is mounted in the hopper 66 with the opposite end portions of the shaft 155a journalled in the legs 137 and 138. The roller 155 is of such diameter, and is so disposed between the drum 140 and the end portion 135b of the one side of the hopper 66 that the space between the roller 155 and the outer peripheral surface of the drum 140 is normally too restricted to permit any of the sticks 131 in the hopper 135 to pass downwardly from the hopper 135 between the outer peripheral surface of the drum 140 and the roller 155.

During rotation of the drum 140 by the drive mechanism D, the drum 140 rotates in a clockwise direction as viewed in Fig. 5 wherein the upper peripheral surface thereof advances from the wall portion 135a toward the wall portion 135b of the hopper 135 so that sticks 131 in the hopper 135 lying on the upper peripheral surface of the drum 140 are continually urged toward the roller 155. A notch 157 is formed in the peripheral surface of the drum 140 and extends thereacross in parallel relation to the horizontal axis of the drum 140. The notch 157 is of such depth that when any one of the sticks 131 is disposed therein, it may pass between the drum 140 and the roller 155 during rotation of the drum 140. Hence, it will be seen that during each rotation of the drum 140, one of the sticks disposed on the peripheral surface thereof in the hopper 66 is picked-up in the notch 157 and is fed thereby past the roller 155.

A chute 159 extends downwardly from the lower surface of the roller 155 around the drum 140 and terminates at its lower end in such position above the trough 114 that any stick 131 passing downwardly from the hopper 66 along the chute 159 is discharged thereby into the trough 114.

A gate 161 is pivotably mounted on a shaft 163 above the chute 159 in position to stop any stick 131 passing downwardly from the hopper 66 just prior to the discharge thereof into the trough 114. This gate 161 is effective to align the sticks 131 passing down the chute 159 into parallel relation to the trough 114 prior to their discharge thereinto.

A gear wheel 165 is mounted on the shaft 142 of the drum 140 outwardly of, and adjacent to, the leg 138, Figs. 1 and 4. A cam 167, Fig. 4, is carried by the gear 165 and is engageable with a lever 169 mounted on the shaft 163. During each rotation of the drum 140, the cam 167 is operable to actuate the lever 169 to thereby rotate the shaft 163 and open the gate 161 to permit the stick 131 which has been fed from the hopper 135 downwardly through the chute 159 into engagement with the gate 161, to pass beneath the gate 161 and be discharged from the chute 159 into the trough 114.

A gear 171 is mounted on the leg 138 by a shaft 173 and is meshed with the gear 165, Figs. 1 and 4. Another gear 175 is mounted on the outer end portion of the shaft 155a of the roller 155 and is meshed with the gear 171. Hence, during rotation of the drum 140 and the gear 165 in a clockwise direction, as viewed in Figs. 4 and 5, the gear 165, through the gear 171, is effective to rotate the gear 175 and, therefore, the roller 155 in a clockwise direction as viewed in Figs. 4 and 5. This clockwise rotation of the roller 155 tends to urge the sticks 131 to move against the direction of movement of the adjacent peripheral surface of the drum 140, and thereby tends to prevent the sticks 131 from passing between the drum 140 and the roller 155, and insures that the sticks 131 will not pass therebetween except when they are disposed in the notch 157.

Two annular grooves 177 and 179, Figs. 1 and 5, are formed in, and extend around, the peripheral surface of the drum 140 in substantially parallel spaced relation to each other. Two fingers 181 and 182 are mounted on the legs 137 and 138, respectively, in position to project into the grooves 177 and 179 upwardly and inwardly of the gate 161, Figs. 1 and 5. These fingers 181 and 182 are so positioned that in the event that one of the sticks 131 passing around the shaft 142 in the notch 157 in the drum 140 should become jammed or stuck in the notch 157, it will be dislodged therefrom by the fingers 181 and 182 in position to fall into the chute 159 behind the gate 161 in time to be released by the gate 161 for discharge into the trough 114.

In a typical operation of my novel machine, the motor 41 of the drive mechanism D rotates the shaft 49 to thereby turn the crank 56 and reciprocate the slide 82 and the ram 123. During rearward movement of the link 169 and, therefore, of the ram 123 and the slide 82, the operator may manually insert a confection-coverd apple such as an apple A, or the like, Figs. 1, 6, 7 and 8 into position between the movable jaw 108 and the leg 116b of the stationary jaw 116. In so positioning the apple A, the operator may manually place the apple either in abutting relation to the movable jaw 108 or to the leg 116b of the stationary jaw 116. In so doing the bosses 118 and 119 assist the operator in properly centering the apple being so positioned, the boss 118 or 119 slipping into the dimple in the respective end of the apple A. During the rearward movement of the ram 123 and the slide 82 or, in other words, to the left as viewed in Fig. 1, a stick 131 in the hopper 66 passes into the notch 137 in the drum 140 and is fed thereby into the chute 159 where it passes down into engagement with the gate 161. The cam 167 engages the lever 169 to thereby open the gate 161 and permit the stick 131 thus discharged from the hopper 66 to be fed downwardly past the gate 161 into the trough 114. During the forward movement of the link 96 by the crank 56, or, in other words, during movement to the right as viewed in Fig. 1, the slide block 92 is moved thereby longitudinally of the slot 87 in the slide 82 toward the end portion 85 of the latter. Such movement of the slide block 92 is effective, through its yielding connection by the spring 94 with the slide 82 to move the slide 82 along the trackway 80 to thereby advance the movable jaw 108 toward the leg 116b of the stationary jaw 116 into position to clamp the previously positioned apple A between the jaws 108 and 116. When the apple A is clamped between the jaws 108 and 116 it is effective to stop further movement of the jaw 108. This stops the movement of the slide 82 and further movement of the block 92 to the right as viewed in Fig. 1 merely compresses the spring 94 to thereby maintain yielding clamping engagement of the jaw 108 with the apple A. During this further movement of the block 92, the ram 123 is advanced toward the apple A so that the pusher pin 125 is effective to positively push the stick 131 previously discharged into the trough 114 from the hopper 66 into the apple A. Inasmuch as the apple A is disposed in abutting relation to the leg 116b of the jaw 116, and the leading end of the stick 131 stops in spaced relation to the leg 116b as previously described, it will be seen that it is insured that, in the operation of my machine, the stick 131 will not be pushed completely through the apple A.

Upon the reverse movement of the link 96, the block 92 and the ram 123 are moved to the left as viewed in Fig. 1. Reverse movement of the ram 123 is effective to move the pusher pin 125 to the left back toward fully retracted position, as shown in Fig. 6. Also, the reverse movement of the block 92 is effective to move the block 92 into engagement with the end portion of the slide 82 to thereby retract the slide 82 into fully retracted position such as shown in Fig. 6. This movement of the slide 82 is effective to space the jaws 108 and 116 sufficiently that the operator may withdraw the apple A, with the stick 131 now inserted therein, from the jaw 108, and immediately position another apple between the jaw 108 and 116 for insertion of another stick thereinto during the next operation of the machine.

From the foregoing, it will be seen that I have afforded a novel machine which will quickly and effectively insert handle sticks and the like, into confection-covered apples, and the like, in a novel and expeditious manner.

Also it will be seen that I have afforded a novel machine wherein the apple is held during the stick-inserting operation in such a manner as to insure that the hand of the operator will not be punctured by the stick.

In addition, it will be seen that I have afforded a novel machine wherein it is assured that the stick being inserted in an apple, or the like, will not be pressed entirely through the apple.

Also, it will be seen that I have afforded a novel machine wherein an apple, or the like, is yieldingly clamped in the machine during the stick-insertion operation in such a manner as to insure that the apple will not be excessively squeezed.

Also, it will be seen that I have afforded a machine which is practical and efficient in operation and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A machine for handling candied apples, and the like, comprising means for clamping such an apple in stationary position, means for feeding a stick into such an apple when said apple is disposed in said position, and means connected to said first two mentioned means for driving the latter in timed relation to each other.

2. A machine for handling candied apples, and the like, comprising drive means operable through a cycle of operation, means yieldably connected to said drive means and operable thereby during said cycle of operation into yielding clamping engagement with such an apple in such relation thereto as to hold said apple in predetermined position, and means connected to said drive means and operable thereby during said cycle of operation after said apple is clamped in said position by said second mentioned means to insert an elongated handle member in said apple.

3. A machine for handling candied apples, and the like, comprising an abutment member, means for clamping such an apple against said abutment member, said means comprising a second abutment member movable toward and away from said first mentioned abutment member, drive means, and a spring connected between said second abutment member and said drive means and operable by the latter to yieldingly move said second abutment member toward said first mentioned abutment member, and means for inserting a handle into said apple, said last named means comprising means connected to said drive means and operable thereby to feed such a handle toward said first mentioned abutment member after movement of said second abutment member toward said first mentioned abutment member.

4. A machine for inserting sticks into candied apples, and the like, comprising drive means, means connected to said drive means and operable thereby to yieldingly clamp such an apple in predetermined position, means connected to said drive means and reciprocable thereby toward and away from said apple when the latter is so clamped in said position, and means connected to said drive means and operable thereby to feed such a stick into position between said apple and said reciprocable means prior to the completion of the reciprocatory stroke of the latter toward said apple for movement by said reciprocable means into said apple during said stroke of said reciprocable means toward said apples.

5. A machine for inserting elongated handles into apples, and the like, comprising an abutment member, elongated supporting means in longitudinal alignment with said abutment member, a drive member reciprocable longitudinally of said supporting means, drive means connected to said drive member for reciprocating the latter longitudinally of said supporting means toward and away from said abutment member, a second abutment member reciprocable longitudinally of said supporting means into and out of position to clamp such an apple against said first mentioned abutment member, a spring mounted between said drive member and said second abutment member in position to yieldingly move the latter into said clamping position during movement of said drive member toward said first mentioned abutment member, means connected to said drive means and movable thereby to move such a handle longitudinally of said supporting means into such an apple when the latter is clamped between said abutment members, and means connected to said drive means and operable thereby in timed relation to said moving means to feed such a handle into position to be so moved by said moving means.

6. A machine for handling apples, and the like, comprising drive means operable through a cycle of operation, means yieldably connected to said drive means and operable thereby during said cycle of operation to yieldingly clamp such an apple in predetermined position, and means for inserting an elongated handle in said apple, said last named means comprising means connected to said drive means and operable thereby when said apple is so clamped in said position to feed said handle longitudinally into said apple.

7. A machine for inserting elongated handles in apples, and the like, comprising means for clamping such an apple in predetermined position, said means comprising a clamping jaw movable toward and away from clamping position relative to said apple, drive means for so moving said clamping jaw, means for feeding such an elongated handle onto said jaw for movement therewith toward said apple, and means connected to said drive means and operable thereby for moving said handle relative to said jaw into said apple when said jaw is disposed in said clamping position relative to said apple.

8. A machine as defined in claim 7, and in which said means for feeding a handle onto said jaw comprises a hopper for holding a plurality of said handles, chute means extending downwardly from said hopper, into position relative to said jaw for feeding said handles from said hopper onto said jaw, a drum rotatably mounted between said hopper and said chute means in position to normally block the passage of said handles from said hopper into said chute means, said drum being connected to said drive means and rotatable thereby through one revolution during each reciprocation of said ram means, said drum having an elongated slot formed therein into which one of said handles may be fed from said hopper during each rotation of said drum to be fed by said drum from said hopper into said chute for discharge onto said jaw.

9. A machine for handling apples, and the like, comprising elongated supporting means, an abutment member mounted at one end of said supporting means, a slide movably mounted on said supporting means for reciprocation therealong toward and away from said abutment member into and out of position to clamp such an apple against said abutment member, means for so reciprocating said slide, said last named means comprising means reciprocable along said supporting means for yieldingly urging said slide toward said abutment member, and means for feeding an elongated stick into said apple when the latter is so clamped against said abutment member, said last named means comprising stick engaging means connected to said means for urging said slide toward said abutment member and reciprocable therewith along said supporting means.

10. A machine for handling apples, and the like, comprising elongated supporting means, an abutment member mounted at one end of said supporting means, a slide movably mounted on said supporting means for reciprocation therealong toward and away from said abutment member into and out of position to clamp such an apple against said abutment member, means for so reciprocating said slide, said last named means comprising means yieldingly connected to said slide, said last named means being movably mounted in said slide and being reciprocable relative thereto and along said supporting means for yieldingly urging said slide toward said abutment member, and means for feeding an elongated stick into said apple when the latter is so clamped against said abutment member, said last named means comprising stick engaging means connected to said means for reciprocating said slide and reciprocable thereby with said slide along said supporting means.

11. A machine for handling apples, and the like, comprising elongated supporting means, an abutment member mounted at one end of said supporting means, a slide movably mounted on said supporting means for reciprocation therealong toward and away from said abutment member into and out of position to clamp such an apple against said abutment member, means for so reciprocating said slide, said last named means comprising a block slidably mounted in said slide and reciprocable relative thereto toward and away from said abutment member, and a spring mounted in said slide and engaged by said block during the movement of the latter toward said abutment member to thereby yieldingly urge said slide along said supporting means toward said abutment member, and means for feeding an elongated stick into said apple when the latter is so clamped against said abutment member, said last named means comprising stick engaging means connected to said block and reciprocable therewith along said supporting means.

12. A machine for handling apples, and the like, comprising elongated supporting means, an abutment member mounted at one end of said supporting means, a slide movably mounted on said supporting means for reciprocation therealong toward and away from said abutment member into and out of position to clamp such an apple against said abutment member, means for so reciprocating said slide, said last named means comprising means reciprocable along said supporting means for yieldingly urging said slide toward said abutment member, and means for feeding an elongated stick into said apple when the latter is so clamped against said abutment member, said last named means comprising a ram mounted on said supporting means and connected to said means for urging said slide toward said abutment member and reciprocable therewith along said supporting means, and means for feeding such an elongated stick into position to be engaged by said ram during movement of the latter toward said abutment member.

13. A machine for handling apples, and the like, comprising elongated supporting means, an abutment member mounted at one end of said supporting means, a slide movably mounted on said supporting means for reciprocation therealong toward and away from said abutment member into and out of position to clamp such an apple against said abutment member, means for so reciprocating said slide, said last named means comprising a block slidably mounted in said slide for reciprocation relative to said slide and longitudinally of said supporting means, and a spring yieldingly connecting said block to said slide for urging said slide toward said abutment member during movement of said block along said supporting means toward said abutment member, and means for feeding an elongated stick into said apple when the latter is so clamped against said abutment member, said last named means comprising means for feeding such a stick onto said slide, and a ram mounted on said block and movable therewith into engagement with said stick, on said slide for moving said stick toward said apple.

14. A machine for inserting elongated sticks into confection-covered apples, and the like, comprising supporting means, an abutment member mounted on said supporting means, a substantially straight elongated trackway mounted on said supporting means in substantially longitudinal alignment with said abutment member, an elongated slide mounted in said trackway in longitudinal alignment therewith, and reciprocable longitudinally therein, said slide having an elongated slot extending longitudinally therein, said slot having closed ends, a block slidably mounted in said slot between said ends, a compression coil spring mounted in said slot between one of said ends and said block, said block being reciprocable through a stroke against said spring toward said one end to thereby yieldingly urge said slide toward said abutment member and a stroke toward the other end of said slot to move said slide away from said abutment member, means movable with said block for retaining said spring in said slot, a second abutment member having a guide passage therein, said second abutment member being mounted in said trackway and attached to said slide for reciprocation therewith longitudinally of said trackway toward and away from position to clamp such an apple in predetermined position against said first mentioned abutment member, said second abutment member having an elongated trough disposed therein in parallel relation to said trackway in alignment with said first mentioned abutment member and with said guide passage, means for feeding an elongated stick into said trough into longitudinally extending relation thereto, ram means mounted on said block and movable therewith through said trough when said slide is disposed in said clamping position to push said stick from said trough through said guide passage into said clamped apple, and drive means, including a motor, connected to said block and said ram means for reciprocating said block and said ram means longitudinally of said trackway toward and away from said first mentioned abutment member, said block and said ram means being so disposed relative to each other that said second abutment member is disposed in said clamping position relative to said apple before said ram means is effective to push said stick into said apple, and said drive means being connected to said feeding means and operable to actuate the latter in timed relation to the reciprocation of said ram means to position a stick in said trough for advancement by said ram means toward said first mentioned abutment member.

References Cited in the file of this patent
UNITED STATES PATENTS 2,733,439    Pikal _____ Feb. 7, 1956
2,740,117    Smith _____ Apr. 3, 1956